Oct. 19, 1926.

K. GAMMEL

AUTOMATIC WEIGHING MACHINE

Filed June 30, 1921 6 Sheets-Sheet 1

1,603,274

INVENTOR
Karl Gammel
BY
Albert M. Austin
ATTORNEY

Oct. 19, 1926.

K. GAMMEL 1,603,274

AUTOMATIC WEIGHING MACHINE

Filed June 30, 1921   6 Sheets-Sheet 4

INVENTOR
Karl Gammel
BY Albert M. Austin
ATTORNEY

Oct. 19, 1926.

K. GAMMEL 1,603,274

AUTOMATIC WEIGHING MACHINE

Filed June 30, 1921 6 Sheets-Sheet 6

INVENTOR
Karl Gammel
BY Albert M. Austin
ATTORNEY

Patented Oct. 19, 1926.

1,603,274

UNITED STATES PATENT OFFICE.

KARL GAMMEL, OF CLEVELAND, OHIO.

AUTOMATIC WEIGHING MACHINE.

Application filed June 30, 1921. Serial No. 481,483.

This invention relates to automatic weighing machines and more particularly to such machines arranged for multiple operation at high speed.

Broadly stated, it is the object of the present invention to provide an improved form of high speed automatic weighing machine which will weigh with extreme accuracy materials to be put into containers such as cans or the like.

More particularly it is an object of the invention to weigh at a very rapid rate an amount of the goods just a little less than that to be placed in one container and to add at a reduced rate of speed a sufficient quantity to bring the total weight to a predetermined amount.

According to another object of the invention a plurality of hoppers is provided whereby the weighing operations of several weighing machines may take place simultaneously.

According to another object an allotter is provided whereby the individual hoppers and weighing machines may be discharged in sequential order without mutual interference.

According to one feature a multiple speed conveyor provides for carrying the material from the supply hopper to the weighing hopper at a rapid rate when the rough weighing operation takes place, and at a reduced rate when the finishing operation takes place.

According to another feature a differential gear for the multiple speed conveyor is provided, whereby control thereof is efficiently effected.

Other objects will appear as the description of the invention progresses.

Referring to the drawings.

Like reference numerals indicate like parts in the several figures of the drawings.

For the purpose of more clearly describing the invention it may be said in a general way that the automatic weighing machine shown in the present embodiment comprises suitable supports and a casing designated in the drawings by reference numerals 15 to 17 and 80 to 82 inclusive; a plurality of individual weighers comprising hoppers, weights, time measuring mechanism, operating solenoids, etc., designated in the drawings by reference numerals 18 to 64 and 83 to 156 inclusive and the master mechanism comprising operating shafts and ejecting mechanism, together with a novel form of allotter, and a master clutch mechanism for measuring a predetermined time interval, all designated by reference numerals 201 to 260 inclusive.

Referring to the drawings the supporting frame of the machine comprises a pair of "bench legs" 15, in spaced relation supporting a casing 16 which may be of any suitable material such as cast iron and which forms an enclosing casing for a portion of the automatic weighing mechanism. Said casing is open at one side for the reception of a glass plate or window 17 whereby the operation of the mechanism may at all times be observed. Suitably mounted on the top of said casing is a plurality of transverse beams 18, there being six such beams shown in the present disclosure. It is understood, however, that any desired number of individual weighing machines may be employed without departing from the spirit of the invention. Each of said beams is pivoted at point 19 and carries upon one of its extreme ends a hopper 20. Each of said hoppers is adapted to discharge its contents into the main hopper 201 by displacement of the lid 21 controlled by an emptying lever 22 which rides within a U-shaped strap 23 secured to an outer face of the hopper 20.

The lever 22 is pivoted at the left-hand end, and is pivotally secured at its right-hand end to the lid 21. The arrangement is such that upon displacement of the beam 18 and its respective hopper 20 to a limited extent, the arm 22 may ride freely within the strap 23, but upon a greater displacement thereof the arm 22 contacts with the upper, inner face of the strap 23 and is forced downwardly thereby. On account of the lever action of the arm 22 the right-hand end thereof (see Figure 3) moves a greater rate than the rate of movement of the hopper 20 and thus the lid 21 is forced away from the open end of the hopper and permits the discharge of the contents.

A supply hopper 30 is provided positioned to feed material through its mouth to the conveyor belt 31 which in turn is discharged upon conveyor belt 32. The conveyor belt 32 is positioned to discharge into the individual hopper 20, there being as many pairs of conveyor belts 31, 32 as there are individual hoppers 20.

The other end of beam 18 pivotally supports a vertical rod 40 to the lower extremity of which is fastened a weight 41 equal to approximately ninety to ninety-eight per cent of the weight of goods to be put into each package.

The casing is provided with an annular shoulder 401 upon which normally rests a second weight 48, corresponding with exact precision to the difference between the weight of the package contents and the first-named weight 41. Thus with a 1—1 ratio of the beam 18 as shown the combined weight of weights 41 and 48 will equal the weight of the package contents. It is obvious that the beam 18 may have any desired ratio and the weights 41 and 48 would be correspondingly proportioned in a well known manner.

Insulatedly mounted upon the weight 41 is a pair of conducting contacts 42, 43, each of which dips into a vessel containing mercury, 44, 45 respectively. Conductors 46, 47 are provided connecting said vessels to the solenoids 153, 155.

An arm 38 pivoted on substantially the vertical plane of the pivot 19 but on the lower portion of casing 16 is pivotally connected to the lower extremity of the rod 40. The beam 18, arm 38, hopper 20, weights 41, 48, rods 50, 40 form a balanced weighing beam system.

At a point intermediate pivot 19 and hopper 20 an aperture in the beam 18 guides a vertical rod 50, the collars 51, 52 being provided to limit the extent of movement of the beam 18 on the rod 50. Said rod 50 is pivoted upon an arm 100 and extends through an aperture in the inwardly extending shelf 60 of casing 16, the aperture thus forming a guide or bearing for the rod 50. A tension spring 53 tends to keep rod 50 in its raised position as shown in Figure 3.

Figure 3:
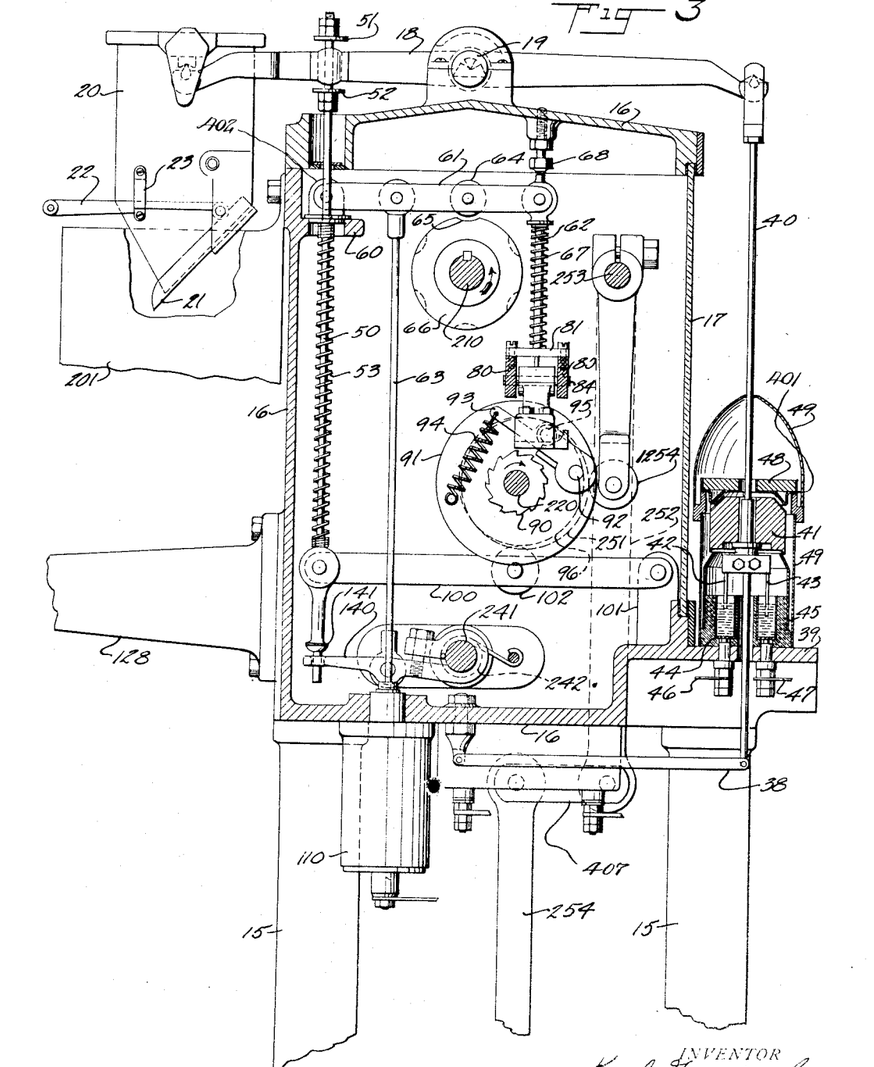
Figure 3 is an end view with parts broken away.
Figure 4:
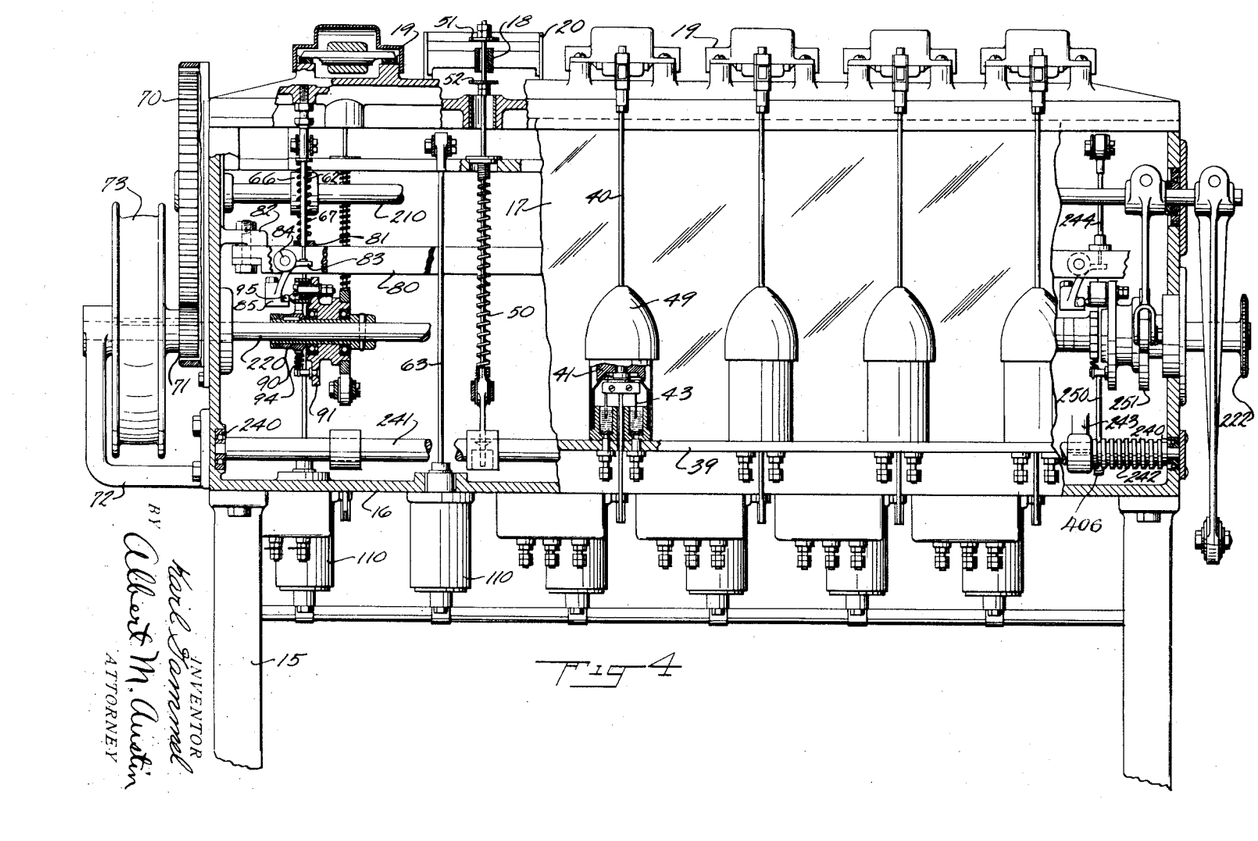
Figure 4 is a longitudinal section through the scale box with certain parts broken away, and taken on line 4—4 of Figure 12.

The shelf 60 is also provided with suitably positioned ears 402, as shown in Figures 3 and 4 (see second weigher from left of Figure 4) upon which is pivoted the beam 61, at the free end of which is pivotally supported a vertical rod 62, the upper limit of travel of which is limited by an adjustable stop 68. At a point relatively near the pivotal support of the beam is supported a second vertical rod 63. Intermediate the points of support of the rod 62 and 63 on said beam 61 is roller 64 adapted to cooperate with a depression 65 of a cam 66 keyed to the constantly driven horizontal shaft 210. As many cams 66 are provided on the shaft 210 as there are beams 61 and individual weighing machines, each having a depression disposed opposite a different point on the periphery of the shaft 210 and preferably equally spaced.

Shaft 210 is directly connected with spur gear 70 which in turn cooperates with pinion 71 secured to shaft 220. The shaft 220 may be driven by a connection with pulley 73 in any well known manner. The protruding end of shaft 220 is supported on a bearing mounted on an arm 72. Secured to the opposite end of shaft 220 is a sprocket wheel 222 for driving the upper shaft 230.

80 designates a pair of centrally positioned arms extending from one end of the casing to the other and being interconnected by means of members 81 and supported by brackets 82 extending inwardly from each end wall of the casing. The member 81 has an aperture which serves as a guide or bearing for the rod 62 and as a stop for a compression spring 67 the tension of which serves to prevent undue friction between roller 64 and the undepressed portion of cam 66 in the position of Figure 3. Opposite each individual weigher there is provided a bell crank lever 83 pivoted upon pin 84 suitably mounted upon said supporting arms 80. The lower end of this bell crank lever is weighted by means of a weight 85 which tends to maintain said lever in the position shown in Figure 4 and by the heavy lines of Figure 7. The weighted end of the lever is provided with a track 86.

Figures 6, 7, 8:
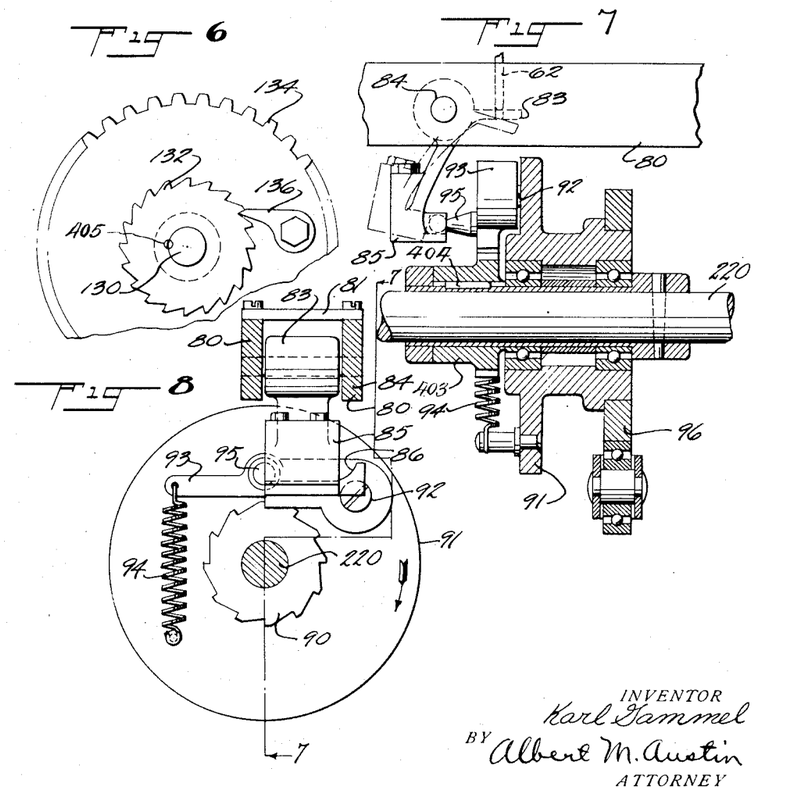
Figure 6 is an enlarged view of a part of the conveyor belt speed control mechanism.
Figure 7 is an enlarged section of a part of the time clutch mechanism taken on the line 7—7 of Figure 8.
Figure 8 is a front view of the mechanism of Figure 7.

Secured to the constantly driven shaft 220 opposite each individual weigher is a ratchet wheel 90 having its teeth facing the direction of rotation. Said ratchet wheel comprises a hub 403 which extends along the shaft 220 and which is provided with a key 404 securing it to said shaft in a well known manner. Loosely mounted on the hub of said ratchet wheel 90, preferably upon ball bearings as clearly shown in Figure 7, is a drum 91. Pivoted on the lateral face of said drum at the pivot 92 is a lever 93 attached to the free end of which is a retractile spring 94 whose other end is secured to drum 91 at a point diametrically opposite the pivot 92. The lever 93 is provided with a laterally extending pin 95 having a ball point formed to ride in track 86. The drum 91 is formed integrally with an eccentric cam 96.

Pivoted on rod 50 at a point near its lower extremity is the arm 100 which is pivotally mounted on bracket 101 extending upwardly from a portion of casing 16 as shown in Figure 3. At an intermediate point on said arm 100 is a roller 102 adapted to cooperate with the eccentric 96. Rotation of the eccentric 96 thus oscillates the arm 100 in a vertical plane.

The lower end of rod 63 is attached to an armature of a solenoid 110 mounted on the lower face of casing 16, there being as many solenoids as there are individual weighers. It will be noted that the operating coil of the solenoid is positioned on the outside of the casing 16 so that the heat generated by the flow of electric current will be readily dissipated. Furthermore, the electrical terminals for connections to the coil are conveniently arranged outside of the casing so that they are readily accessible.

Keyed to the shaft 230, one for the high speed differential gear and one for the low speed differential gear of each weigher is a bevel gear 120 having a hub or collar. Corresponding to each such gear, there is loosely mounted on said hub a differential housing 121. Rotatably mounted in each of said housings is a plurality of pinion gears 122 meshing with the gear 120. Meshing with said gears 122 is a second bevel gear 123 loosely mounted and supported upon shaft 230 and having a hub or collar. Secured to the hub of the gear 123 is a sprocket 124 for the low speed mechanism and a corresponding sprocket 125 for the high speed mechanism.

A shaft 130 is supported on a pair of upwardly extending members 129 integral with the frame member 128 (see Figure 3). One of such shafts 130 is provided for each individual weigher. At each end of each of said shafts is a ratchet 131, 132 secured to the shaft by means of a key 405 as shown in Figure 6. Loosely mounted on shaft 130 are the sprockets 133 and 134, each immediately adjacent to ratchet wheels 131, 132 respectively. Secured to the sprocket wheel 134 is a pawl 136 as shown in Figure 6; and secured to sprocket wheel 133 is a corresponding pawl 135. The sprocket wheel 133 is connected with sprocket wheel 124 by means of a driving chain 137 and sprocket wheel 134 is connected with sprocket wheel 125 by means of a chain 138. Keyed to the shaft 130 is a pulley 139 over which rides the conveyor belt 31. It will be seen that sprocket wheels 124 and 125 vary in size so as to secure different desired speeds.

Mounted in ball bearings 240 in the end faces of casing 16 and in the lower portion thereof as shown in Figure 4 is a horizontal shaft 241, secured to which opposite each individual weigher is a lever 140 adapted to cooperate with a collar 141. Said shaft is held under tension by means of a spring 242 against a nose 243 extending transversely from a portion of a casing 16. At the end of shaft 241 shown at the right of Figure 4 there is secured to said shaft a lever 406 similar to 140 but adapted to cooperate with a master rod 250 whose function is to operate a clutch mechanism somewhat similar to that designated by reference numerals 83 to 95 inclusive. The master mechanism includes the said rod 250 corresponding to the rod 50 as well as a rod 244 corresponding in construction and operation to the rod 62. This master clutch mechanism is in direct longitudinal line with that previously described and operates in a similar manner. Instead of having an eccentric cam 96, however, it is provided with the eccentric cam 251 which cooperates with a vertically disposed arm 252 pivoted at the point 253. The arm 252 has a roller 1254 at an intermediate point thereon. Thus when the eccentric 251 makes a revolution in the same manner as eccentric 96, the arm 252 is given a movement in a transverse vertical plane. The free end of arm 252 is connected by means of a link 407 with lever 254, which may be employed for any desired purpose as, for example, ejecting the filled package or for pressing the material into the package, and any number of such clutches and arms corresponding to such functions may be provided. As shown in the present disclosure the arm is employed for ejecting the filled package.

It will be understood that the master clutch mechanism operated by rod 250 is given a time lag due to the interval required for eccentric 251 to make one revolution and thus there is allowed a suitable interval for filling the receptacle with the material which has just been weighed before pressing down the contents or before ejecting the filled receptacle or for any other purpose. Conveyor belt 261 is provided for bringing the empty receptacles into place under the hopper 201 and may be driven in any desired manner in the direction indicated by the arrow in Figure 2.

Figures 1, 2:
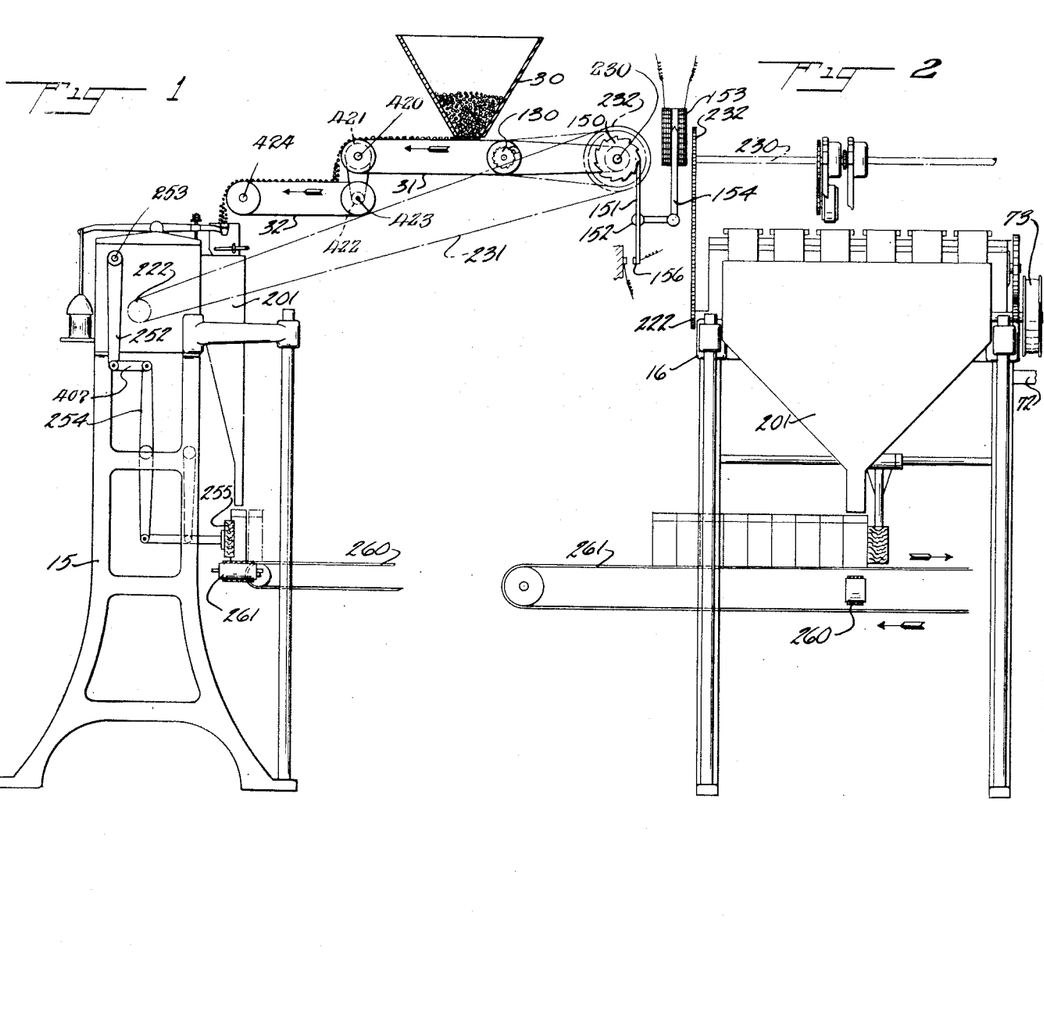
Figure 1 is a side elevation of the weighing machine of the present invention.
Figure 2 is a front elevation including the belt mechanism.

A second conveyor belt 260 is also provided for carrying filled receptacles away. A shoe 255 relatively connected with the lever 254 is normally positioned to act as a stop for the empty receptacles whereby the receptacle at the head of the line is held in position directly underneath the main hopper 201 until filled. Upon actuation of the lever 254 and the movement of the shoe 255, the first receptacle when filled is pushed off the belt 261 and upon the belt 260 by which it is carried to any desired point, as to a sealing machine. While maintained in position on the belt 261 before being filled, the empty containers remain stationary upon the upper surface of the conveyor belt 261 which is driven continuously, being slidably maintained thereon by the shoe 255 as indicated in Figure 2.

Figure 5:
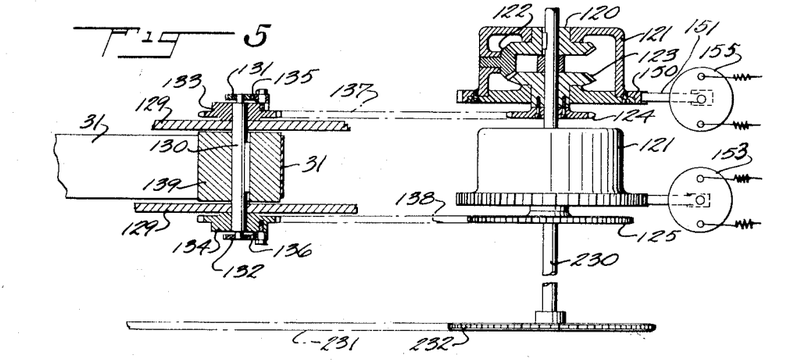
Figure 5 is a view of the differential gear and the conveyor belt speed control mechanism.
Figure 11:
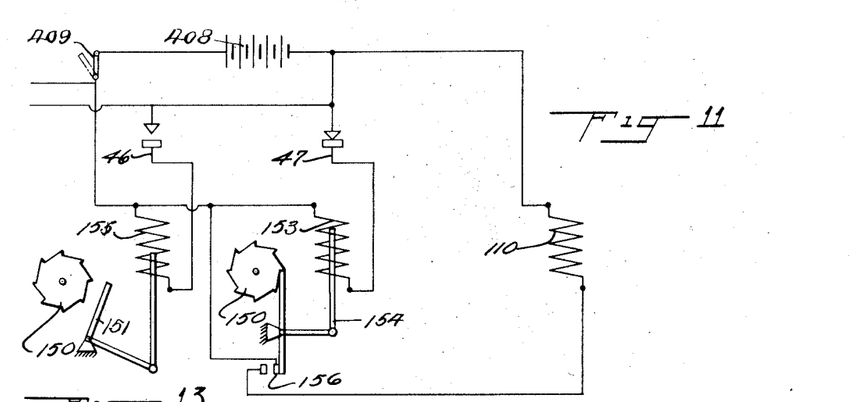
Figure 11 is a wiring diagram of the electrical apparatus employed.
Figures 12, 13:
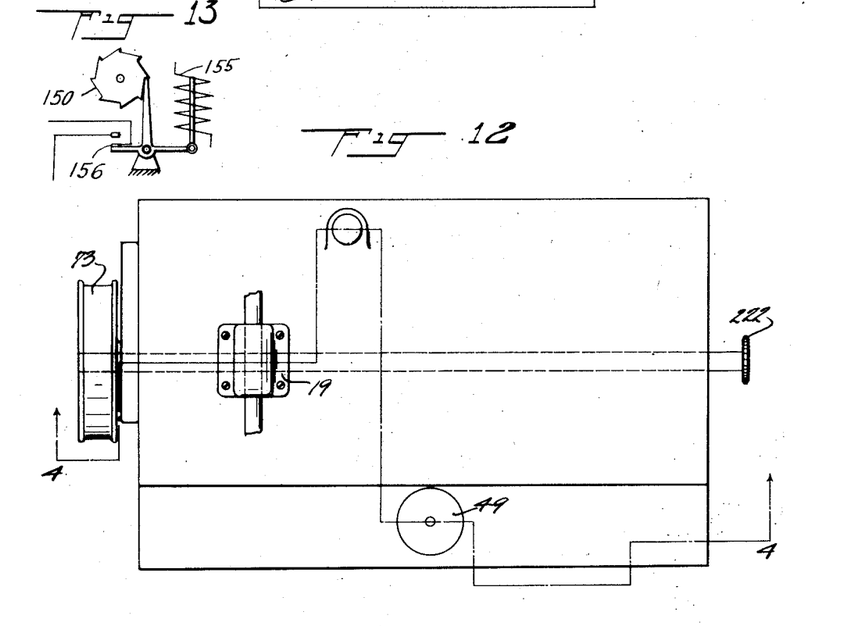
Figure 12 is a diagrammatic plan view of the machine.
Figure 13 is a modification of the solenoid 155 of Figure 11.

The housing 121 is provided with a flange 150, the periphery of which is constructed in the form of a ratchet wheel. Engaging the teeth of this ratchet wheel is a pawl 151 pivoted at 152 as shown in Figure 1. The pawl 151 is operatively connected to an armature 154 of a solenoid 153 by suitable link connections. A similar housing 121 is provided in alignment with the first-named housing, and has a similar flange constructed in the form of a ratchet wheel. Engaging the teeth of this ratchet in a similar manner is a second pawl, which is operatively connected by suitable link connections to the armature of a second solenoid 155. The differential mechanism comprising the housing 121 associated with the solenoid 153 co-operates with a relatively small sprocket 124, as shown in Figure 5, to secure a low speed drive, and the differential mechanism associated with the solenoid 155 co-operates with the sprocket 125 of relatively larger size for high speed operation. Thus it will be seen that the solenoid 153 is adapted to control the rotation of the differential mechanism for low speed and that the solenoid 155 is adapted for controlling the second-named differential mechanism for high speed operation. The pawl 151 associated with the low-speed control solenoid 153 is provided with a contact 156, the circuit through which is closed when the solenoid 153 is de-energized. Figure 11 shows the positions of the armatures and respective pawls when the high-speed solenoid 155 is de-energized and the low-speed solenoid is energized.

Referring to Figure 11, solenoid 153 is connected by means of conductor 46 to the mercury vessel 44 whose co-operating contact 42 breaks when the rod 40 is lifted a predetermined extent. Similarly solenoid 155 is connected by means of conductor 47 to the mercury vessel 45 cooperating with the terminal 43, whose contact with the mercury does not break until the rod 40 has been lifted to a greater extent. A source of current, preferably in the form of a storage battery 408, is provided for the circuit as shown, a master switch 409 being employed to disconnect the same when the machine is idle. The contact 156, which is closed when solenoid 155 is de-energized, is adapted to control the circuit from the battery to scale mechanism solenoid 110 for a purpose which will be subsequently set forth.

Figure 9:
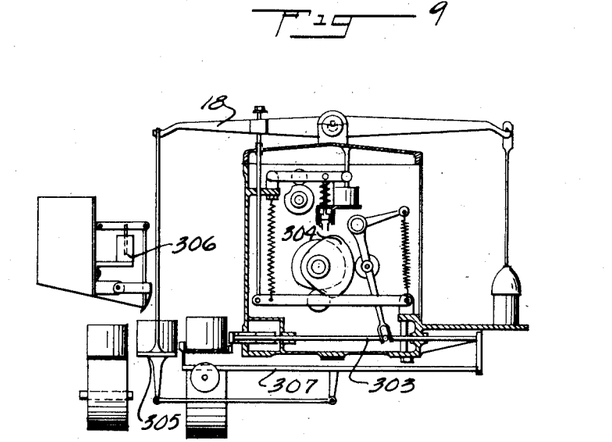
Figures 9 and 10 are modifications of the machine adapted to weigh the container together with the contents thereof.
Figure 10:
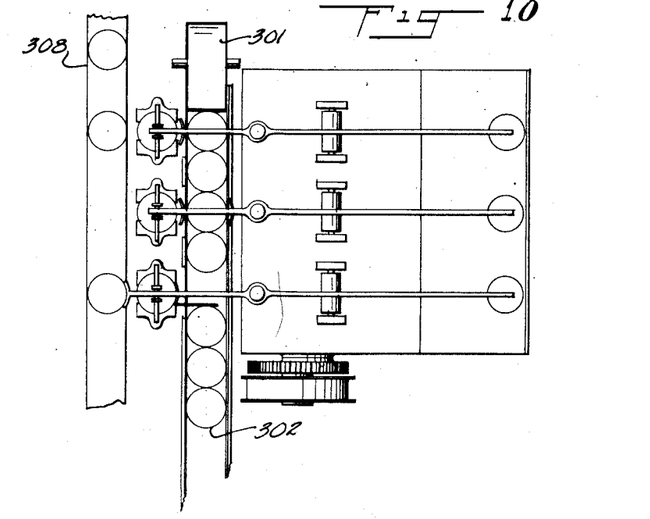

In Figures 9 and 10 there is shown a modification of the structure by means of which the receptacle to contain the material is weighed together with the material. In this embodiment three individual weighers are shown and the conveyor belt 301 is adapted to bring into operative relation with each of them receptacles such as 302. As a receptacle comes opposite to an individual weigher the horizontal rod 303 actuated by means of eccentric 304 pushes the receptacle off the conveyor belt and onto the platform 305, which is supported upon the beam 18 in place of the individual hopper 20 of Figure 3. The eccentric 304 may be operated by a clutch mechanism similar to that shown in Figure 8. The receptacle is thereupon filled with material, the filling being controlled by means of a solenoid 306 corresponding with solenoids 153 and 155. It is understood that a pair of solenoids may be employed in the same manner as previously described, so that the receptacle may be filled rapidly for the rough weight and slowly for the finished weight. When the weighing operation is complete, rod 307 is actuated in the same manner as lever 254 and the weighed receptacle is pushed off the platform 305 and onto a second conveyor belt 308 which brings it to a delivery platform as desired. It is understood that conveyor belt 301 may be continued to other individual weighers or may bring such receptacles as have not been acted upon by the rod 303 to a point where they can be used over again, if desired.

In the operation of the automatic weighing machine of the present invention the supply hopper 30 is filled with material and continually refilled as necessary; and a source of power is belted to the pulley 73 and causes rotation of shafts 210 and 220 in the directions indicated by the arrows in Figure 3. By means of sprockets 222 and 232 and a chain belt meshing therewith the shaft 230 is operatively connected with the shaft 220. The shaft 230 supplies power to the differential gears of all of the individual weighers. When the associated solenoids, such as 153, 155, are de-energized as is the normal condition, the housings 121 of the differential gears are free to rotate and the friction of the sprockets 124, 125 and mechanism operatively connected therewith is sufficiently great to maintain said sprockets inactive, so that the housings 121 rotate freely around the bevel gear 123.

The belts 31, 32 are actuated by means of connections with shaft 230 as clearly shown in Figure 1 and move in the direction indicated by the arrows. The end of the belt 31 opposite the drive shaft 230 passes over a suitable roller affixed to a shaft 420 mounted in bearings on the frame of the machine in any suitable manner. Keyed to the shaft 420 is a pulley 421 which is operatively connected to a pulley 422 of relatively smaller size. The pulley 422 is affixed to a shaft 423 suitably mounted in bearings on the frame. Affixed to the shaft 423 is a roller for supporting one end of the belt 32, the other end of the belt being supported on a roller on a shaft 424 mounted in bearings for free rotation. The drive shaft 230 thus causes movement of the conveyor belt 31, the movement of which is communicated to the belt 32 through the pulleys 421 and 422. The belt 32 moves at a speed somewhat greater than that of belt 31, so that as the material drops from the belt 31 to the belt 32 it is spread out, thus securing greater accuracy in weighing.

Referring to Figure 11, closing of the master switch for connecting the source of current to the circuit causes the operation of solenoids 153 and 155. The circuit of solenoid 110 may at this time be momentarily energized, but the speed of operation of solenoid 153 is sufficiently great that the armature of solenoid 110 does not become effective, the energizing circuit being immediately opened at contact 156.

The energizing of solenoids 153 and 155 causes the attraction of their respective armatures, whose pawls engage the teeth of the flange 150, thereby preventing the housings 121 from turning. Thus the sprockets 124 and 125 are caused to rotate and these in turn operate sprockets 133 and 134. The speed of sprocket 134 is somewhat greater than that of 133, due to the relative sizes of spocket wheels 125 and 124. Thus the dog or pawl 136 is caused to engage a tooth of ratchet 132. On the other hand ratchet 131, which is keyed to the same shaft 130, as is the ratchet 132, rides freely past the dog 135 of the sprocket 133 since the ratchet 131 is being driven at a rate faster than that of spocket 133. It will thus be seen that shaft 130 and its pulley 139 respond to the higher rate of speed.

The movement of belts 31 and 32 feeds material into hopper 20 and when the amount of material therein is sufficiently great, it causes the gradual tilting of the beam 18. The feeding of material occurs at a rapid rate because sprocket 125 is effective. When the weight 41 is lifted by movement of beam 18 so that contact 42 leaves the mercury contained in vessel 44, the circuit of solenoid 155 is broken and the consequent retraction of its armature withdraws the pawl 151 from engagement with the ratchet of the flange ratchet 150. Thus the housing 121 of the high speed differential gear is again released and permitted to rotate freely. As before, the sprocket 125 comes to rest because of friction in the various parts connected thereto. The dog or pawl 135 now becomes effective and causes the sprocket 132 to drive the ratchet 131 and shaft 130 at a speed determined by sprocket 124. Thus the conveyor belt 31 is now driven at a relatively low rate of speed, thereby securing a high degree of accuracy in discontinuing feeding material into the hopper 20.

The beam 18 continues to tilt as the material is fed into the hopper and weight 41 continues to be raised. The weight 41 engages the weight 48 and lifts it upwardly. This operation continues until the predetermined quantity of material has been placed in hopper 20, whereupon contact 43 breaks contact with the mercury in vessel 45 and releases the solenoid 153. The pawl is withdrawn from the low speed differential housing and sprocket 124 comes to rest. This stops pulley 139 and belts 31 and 32.

The solenoid 153 is provided with a contact which is closed when the respective armature is in its normal or retracted position and open when the solenoid is energized. For the purpose of the present disclosure the contact is shown open and it is understood that when the respective solenoid is deenergized the armature is released by means of a retractile spring (not shown), and the contact closed. The solenoids 153, 155 are of conventional construction, and detailed descriptions therefore are not deemed necessary.

The release of the armature of solenoid 153 closes contact 156 and energizes magnet 110, which attempts to pull down its armature and the rod 63 secured thereto. If the cam 66 has not yet reached a position in which the depression 65 is opposite the roller 64, the rod 63 cannot be pulled down since roller 64 will engage the undepressed surface of the cam 66. If the cam 66 has already passed the position described because of, for example, unusually slow feeding of the material, or for any other reason, the rod 63 and the arm 61 cannot be lowered and it is necessary to wait for another complete revolution of the shaft 210 before further operations on this weigher take place. When cam 66 brings depression 65 into place beneath roller 64 the arm 61 and rods 62 and 63 come down in opposition to the spring 67 under control of energized solenoid 110. The lower extremity of rod 62 engages an end of the bell crank lever 83 which is displaced into the position shown by the dotted lines of Figure 7. The ball point of the pin 95 is thereby released, permitting lever 93 secured thereto to be acted upon by the tension spring 94. Thus the lever 93 is displaced from the position shown in Figure 3 to that shown in Figure 8 and a raised portion thereof engages the ratchet 90, which is constantly rotating with the shaft 220. Continued rotation of the cam 66 forces the roller 64 out of the depression 65 and the arm 61 is forced in an upward direction carrying with it the associated rods 62 and 63. The upward movement of the rod 62 permits the restoration to normal by force of gravity of the lever 83, this lever being weighted, as has been described.

The drum 91 is caused to rotate in synchronism with shaft 220 and carries with it the cam 96. This continues for a single revolution of the drum 91 after which the bell crank lever 83, which becomes reset during the interval of one revolution, again contacts with the pin 95 and causes restoration of lever 93 into its original position shown in Figure 3. During the single revolution mentioned arm 100 is displaced downwardly once carrying with it the rod 50. The collar 51 attached to the rod 50 causes arm 18 to be tilted to a greater extent than has hitherto occurred and the emptying lever 22 contacts with the master hopper 201, thereby causing the lid 21 of the hopper 20 to be opened. The contents of hopper 20 are thus discharged into the master hopper 201 and through it into the receptacle waiting on conveyor belt 261. It will be noted that the hopper 20 is kept open so long as the raised portion of the cam 96 holds arm 100 displaced and the time required for a revolution of shaft 220 is such that this is amply sufficient to discharge the hopper 20.

Downward movement of the rod 50 causes the collar 141 to contact with the arm 140 thus oscillating the shaft 241. Rocking of shaft 241 to which the collar 141 is secured causes the rod 250 to be moved downwardly and this in turn causes a downward movement of a master shaft 244 which corresponds in the following description to the rod 62. The master clutch mechanism is thereby operated in a manner similar to that just described for the individual clutch mechanism controlled by bell crank lever 83 and causes a cam 251 to oscillate the arm 252. This controls the movement of a shoe 255 which ejects the filled package from beneath the hopper 201 and permits movement of a subsequent container for filling. Continued movement of shaft 220 restores the cam 251 and the cooperating members 252, 253, 254, 255. Continued movement of shaft 210 restores arm 61. Continued movement of shaft 220 restores the cam 96 and permits the restoration of arm 100 and beam 18 to normal and the closure of the hopper 20 for a subsequent operation under control of spring 53. Restoration of beam 18 restores the weights 41 and 48.

While the contents of hopper 20 were being weighed, those of an adjacent and similar hopper were also being weighed by a corresponding individual weigher. It will be seen that the allotter which comprises the shaft 210 and a plurality of variously characterized cams 66 determines which of these individual weighers shall discharge its contents into the hopper 201 and positive means are thus obtained for insuring the discharge of only a single hopper 20 at one time. It will also be noted that a container is being filled during the rotation of cam 96, and the speed of the driving mechanism connected to the pulley 73 for operating the machine is adjusted by suitably varying the speed of the prime mover in a well-known manner to drive the cam 96 at a speed so that the material will all flow through the mechanism and into the container.

It will be seen that I have provided an automatic weighing machine in which material may be accurately and quickly weighed and discharged into containers. By providing a plurality of individual weighers which can take the time necessary to secure accurate weighing in combination with a single automatic filling and ejecting apparatus which operates very quickly, I employ the various mechanisms noted in a highly efficient manner. Furthermore, considerable time is saved by feeding roughly about ninety to ninety-eight per cent of the quantity of material desired at an extremely high speed and then feeding the exact weight slowly, in order to get the total desired weight. It will be understood that a greater number of speeds than that shown may be employed if desired by providing a greater number of weights such as 41, 48 and a greater number of differential gears without departing from the spirit of the invention.

The machine of the present disclosure embodies carefully balanced weighing beams which operate with little friction and which control the automatic mechanism, there being practically no additional friction introduced by the mercury contacts preferably employed. It is understood, however, that other contacting means of controlling the electrical circuits may be employed for the same purpose. If desired, a single conveyor belt may be employed in place of the belts 31, 32 of the present embodiment.

The present disclosure shows specific means for the practice of the invention, but it is understood that its scope is not to be determined thereby, reference being had to the appended claims for that purpose.

What is claimed is:—

1. In an automatic weighing machine, a plurality of scale beams each having a hopper secured to one portion thereof and a pair of weights secured to a different portion thereof, to balance the scale beam when a predetermined quantity of material has been deposited in the hopper, means for depositing material into said hopper at a rapid and at a slow rate, means controlled by one of said weights actuated by a predetermined movement of said beam for discontinuing deposit of material at the rapid rate, means controlled by the other of said weights and actuated by further movement of the beam for discontinuing movement at the slow rate, and means for emptying said hoppers in a predetermined order.

2. In an automatic weighing machine, a plurality of scale beams each having a hopper secured to one portion thereof and a pair of weights secured to a different portion thereof to balance the scale beams when a predetermined quantity of material has been deposited in the hopper, conveyor mechanism for depositing material into said hopper, driving means for driving said mechanism at a rapid rate, driving means for driving said mechanism at a slow rate, a clutch for operatively interconnecting said conveyor mechanism and said rapid driving means whereby to deposit material at the rapid rate, a clutch for operatively interconnecting said conveyor mechanism and said slow rate driving means whereby to deposit material at the slow rate, means controlled by each of said weights and operated by movement of the respective beams for operating said clutches successively, and means for emptying said hoppers in a predetermined order.

3. In an automatic weighing machine, a plurality of scale beams each having a hopper secured to one portion thereof and a pair of weights secured to a different portion thereof, a conveyor mechanism for depositing material into said hopper at a rapid and at a slow rate, a clutch for discontinuing deposit of material at the rapid rate, a clutch for discontinuing movement at the slow rate, and means controlled by each of said weights and operated by movement of the respective beams for operating said clutches successively in a predetermined order.

4. In an automatic weighing machine, a plurality of scale beams each having a hopper secured to one portion thereof and a pair of weights secured to a different portion thereof for balancing the respective beam when a predetermined mass of material to be weighed is deposited in the respective hopper, a conveyor mechanism for depositing material into said hopper, driving means for driving said conveyor mechanism at a rapid rate, driving means for driving said conveyor mechanism at a slow rate, a clutch for operatively interconnecting said conveyor mechanism and the rapid rate driving means whereby to deposit material at the rapid rate, a clutch for operatively interconnecting said conveyor mechanism at the slow rate and the rapid, means controlled by each of said weights and operated by movement of the respective beams for operating said clutches successively in such manner that the rate of deposit is first reduced to a predetermined rate and then to zero, means operative when the rate of deposit has been reduced to zero for emptying the respective hopper and allotter mechanism common to all of said scale beams for controlling said emptying means one at a time.

5. In an automatic weighing machine, a plurality of scale beams each having a hopper secured to one portion thereof and a pair of weights secured to a different portion thereof for balancing the respective beam when a predetermined mass of material to be weighed is deposited in the respective hopper, means conveying mechanism for depositing material into said hopper at a rapid and at a slow rate respectively, an electromagnet for controlling the operation of one of said conveying mechanisms and controlled by one of said weights and actuated upon a predetermined movement of the respective beam arranged to arrest movement of the respective conveying mechanism to discontinue deposit of material at the rapid rate, an electromagnet for controlling the operation of the other of said conveying machines and controlled by the other of said weights and actuated upon further movement of the respective beam arranged for controlling the operation of the other of said conveying mechanism and to discontinue deposit at the slow rate, and means for emptying said hoppers successively.

6. In an automatic weighing machine, a plurality of scale beams each having a hopper secured to one portion thereof and a pair of weights arranged to counterpoise said hopper, conveying mechanisms for depositing material into the hopper at a rapid rate and at a slow rate, respectively, a source of material arranged to deposit material upon said conveying mechanism, means controlled by said weights respectively, for stopping the rapid conveying mechanism and the slow conveying mechanism successively upon movement of the scale beam under control of depositing material, and means for emptying said hoppers in predetermined order.

7. In an automatic weighing machine, a beam having a hopper secured to one portion thereof and a pair of weights arranged to counterpoise said hopper, conveying mechanisms for depositing material into the hopper at a rapid rate and at a slow rate, respectively, a source of material arranged to deposit material upon said conveying mechanism, means for stopping the rapid conveying mechanism when the effect of one of said weights has been overcome and means for stopping the slow conveying mechanism when the effect of the remaining weight has been overcome.

8. In an automatic weighing machine, a beam having a hopper secured to one portion thereof and a pair of weights arranged to counterpoise said hopper, conveying mechanisms for depositing material into the hopper at a rapid rate and at a slow rate, respectively, a source of material for depositing material upon said conveying mechanisms, means for stopping the rapid conveying mechanism and the slow conveying mechanism successively upon movement of the scale beam under control of deposited material and said pair of weights, and means for emptying the hopper into a container.

9. In an automatic weighing machine, a beam having a hopper secured to one portion thereof and a pair of weights arranged to counterpoise said hopper, conveying mechanisms for depositing material into the hopper at a rapid rate and at a slow rate, respectively, a source of material for depositing material upon said conveying mechanism, means for stopping the rapid conveying mechanism and the slow conveying mechanism successively upon movement of the scale beam under control of deposited material and said pair of weights, and means for emptying the hopper into a container actuated by further movement of the respective beam.

10. In an automatic weighing machine, a beam having a hopper secured to one portion thereof and a pair of weights arranged to counterpoise said hopper, conveying mechanisms for depositing material into the hopper at a rapid rate and at a slow rate, respectively. a source of material for depositing material upon said conveying mechanisms, means for stopping the rapid conveying mechanism and the slow conveying mechanism successively upon movement of the scale beam under control of deposited material and said pair of weights, means for emptying the hopper into a container, and means operative when both of said conveying mechanisms are stopped to advance the filled container.

11. In an automatic weighing machine, a beam each having a hopper secured to one portion thereof and a pair of weights arranged to counterpoise said hopper conveying mechanisms for depositing material into the hopper at a rapid rate and at a slow rate respectively, a source of material for depositing material upon said conveying mechanisms, means for stopping the rapid conveying mechanism and the slow conveying mechanism sucessively upon movement of the scale beam under control of depositing material and said pair of weights, means for discharging the contents of the hopper into a container, means operative when both of said conveying means are stopped to advance the filled container, and means for delaying for a predetermined time interval the operation of said advancing means to permit the contents of the hopper to be fully discharged.

12. In an automatic weighing machine, a weighing mechanism adapted to be operated at two different rates, means for operating said mechanism at a rapid rate until an amount of goods slightly less than that comprising a predetermined quantity has been weighed, and means for operating said mechanism at a reduced rate of speed until a greater amount has been weighed.

13. In an automatic weighing machine, a weigher having a scale beam, a hopper secured to one end of said beam, a pair of weights on the other end of said beam, one of said weights comprising a major portion of the weight corresponding to the predetermined weight to be weighed and the other corresponding to the remaining portion of the predetermined weight, means for depositing material into the hopper at a rapid and at a slow rate, a solenoid connected with said rapid depositing means for controlling the operation of the same, a second solenoid connected with said slow depositing means for controlling the operation of the same, a contact opened by movement of the beam when the first-named weight is raised arranged to control the first-named solenoid, a second contact opened by the beam when both of said weights are raised arranged to control the second-named solenoid, a third contact closed when the second-named solenoid is de-energized, a third solenoid controlled by said third contact, and means active upon energization of said third-named solenoid arranged to prevent movement of the beam.

14. In an automatic weighing machine for weighing the contents of a container, a hopper having a scale beam upon which said hopper is supported, means for depositing material into the hopper at a rapid and at a slow rate respectively, a solenoid connected with said rapid depositing means for controlling the operation of the same, a contact for controlling the solenoid actuated by a predetermined movement of the respective beam, a second solenoid connected with said rapid depositing means for controlling the slow depositing means and a second contact for controlling the last-named solenoid actuated by additional movement of the beam.

15. In an automatic weighing machine, a hopper, means for depositing material into the hopper at a rapid and at a slow rate respectively, a solenoid connected with each of said depositing means for controlling same and a pair of contacts actuated in successive order by movement of said beam for controlling the operation of the respective solenoids.

Signed at Cleveland in the county of Cuyahoga and State of Ohio this 22nd day of June A. D. 1921.

KARL GAMMEL.